US012596500B2

(12) United States Patent
Gieske et al.

(10) Patent No.: US 12,596,500 B2
(45) Date of Patent: Apr. 7, 2026

(54) BLOOM FILTER INTEGRATION INTO A CONTROLLER

(71) Applicant: Micron Technology, Inc., Boise, ID (US)

(72) Inventors: Edmund J. Gieske, Cedar Park, TX (US); Cagdas Dirik, Indianola, WA (US); Elliott C. Cooper-Balis, San Jose, CA (US); Robert M. Walker, Raleigh, NC (US); Amitava Majumdar, Boise, ID (US); Sujeet Ayyapureddi, Boise, ID (US); Yang Lu, Boise, ID (US); Ameen D. Akel, Rancho Cordova, CA (US); Niccolò Izzo, Vignate (IT); Danilo Caraccio, Milan (IT); Markus H. Geiger, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/227,216

(22) Filed: Jul. 27, 2023

(65) Prior Publication Data

US 2024/0036762 A1 Feb. 1, 2024

Related U.S. Application Data

(60) Provisional application No. 63/392,835, filed on Jul. 27, 2022.

(51) Int. Cl.
*G06F 3/06* (2006.01)
*G06F 12/0802* (2016.01)

(52) U.S. Cl.
CPC .......... *G06F 3/0656* (2013.01); *G06F 3/0604* (2013.01); *G06F 3/0673* (2013.01); *G06F 12/0802* (2013.01); *G06F 2212/60* (2013.01)

(58) Field of Classification Search
CPC .... G06F 3/0604; G06F 3/0656; G06F 3/0673; G06F 12/0802; G06F 2212/60;
(Continued)

(56) References Cited

U.S. PATENT DOCUMENTS

| | | | | |
|---|---|---|---|---|
| 11,347,808 B1 * | 5/2022 | Plenderleith | ........ | G06F 16/2455 |
| 2014/0029367 A1 * | 1/2014 | Jung | .................. | G11C 11/4063 365/222 |

(Continued)

OTHER PUBLICATIONS

H. Song, F. Hao, M. Kodialam and T. V. Lakshman, "IPV6 Lookups using Distributed and Load Balanced Bloom Filters for 100Gbps Core Router Line Cards," IEEE INFOCOM 2009, Rio de Janeiro, Brazil, 2009, pp. 2518-2526, doi: 10.1109/INFCOM.2009.5062180. (Year: 2009).*

(Continued)

*Primary Examiner* — Rocio Del Mar Perez-Velez
*Assistant Examiner* — Julian S Mendel
(74) *Attorney, Agent, or Firm* — Brooks, Cameron & Huebsch, PLLC

(57) ABSTRACT

Systems, apparatuses, and methods related to bloom filter implementation into a controller are described. A memory device is coupled to a memory controller. The memory controller is configured to implement a counting bloom filter, increment the counting bloom filter in response to a row activate command of the memory device, determine whether a value of the counting bloom filter exceeds a threshold value, and perform an action in response to the value exceeding the threshold value.

19 Claims, 5 Drawing Sheets

(58) Field of Classification Search
CPC ...... G06F 13/4221; G06F 5/065; G06F 3/067;
G06F 16/22; G06F 16/2282; G06F
16/901; G06F 16/3346; G06F 16/9014;
G11C 11/4078; G11C 11/408; G11C
11/40603
See application file for complete search history.

(56) References Cited

U.S. PATENT DOCUMENTS

| | | | |
|---|---|---|---|
| 2014/0189215 A1* | 7/2014 | Kang | G11C 11/40603 711/106 |
| 2019/0073161 A1* | 3/2019 | Nale | G06F 13/20 |
| 2019/0213218 A1* | 7/2019 | Sharifi Tehrani | G06F 12/0246 |
| 2020/0034305 A1* | 1/2020 | Agarwala | G06F 12/0868 |
| 2020/0342934 A1* | 10/2020 | Lee | G11C 11/4087 |
| 2021/0390998 A1 | 12/2021 | Delcheh | |

OTHER PUBLICATIONS

M. J. Kim et al., "Mithril: Cooperative Row Hammer Protection on Commodity DRAM Leveraging Managed Refresh," 2022 IEEE International Symposium on High-Performance Computer Architecture (HPCA), Seoul, Korea, Republic of, 2022 (Year: 2022).*
A. G. Yağlikçi et al., "BlockHammer: Preventing RowHammer at Low Cost by Blacklisting Rapidly-Accessed DRAM Rows," 2021 IEEE International Symposium on High-Performance Computer Architecture (HPCA), Seoul, Korea (South), 2021, pp. 345-358, doi: 10.1109/HPCA51647.2021.00037, 14 total pages.

* cited by examiner

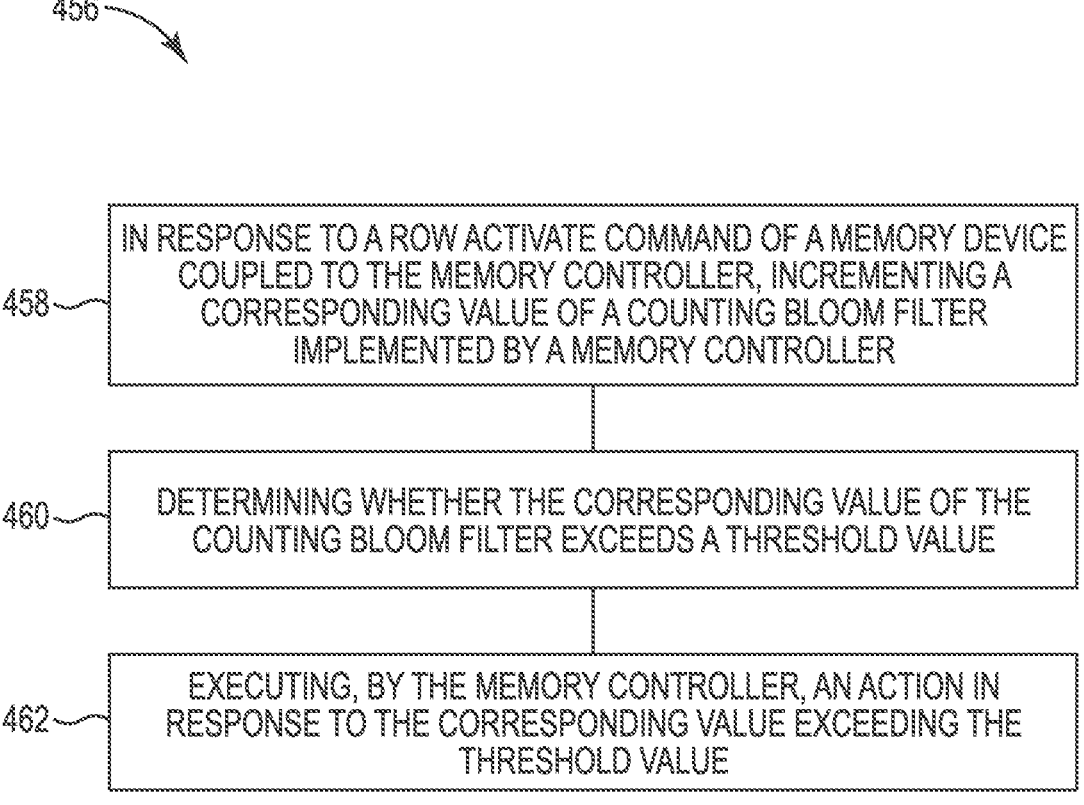

456

458 — IN RESPONSE TO A ROW ACTIVATE COMMAND OF A MEMORY DEVICE COUPLED TO THE MEMORY CONTROLLER, INCREMENTING A CORRESPONDING VALUE OF A COUNTING BLOOM FILTER IMPLEMENTED BY A MEMORY CONTROLLER

460 — DETERMINING WHETHER THE CORRESPONDING VALUE OF THE COUNTING BLOOM FILTER EXCEEDS A THRESHOLD VALUE

462 — EXECUTING, BY THE MEMORY CONTROLLER, AN ACTION IN RESPONSE TO THE CORRESPONDING VALUE EXCEEDING THE THRESHOLD VALUE

FIG. 4

BLOOM FILTER INTEGRATION INTO A CONTROLLER

PRIORITY INFORMATION

This application claims the benefit of U.S. Provisional Application No. 63/392,835, filed on Jul. 27, 2022, the contents of which are incorporated herein by reference.

TECHNICAL FIELD

The present disclosure relates generally to semiconductor memory and methods, and more particularly, to apparatuses, systems, and methods for bloom filter integration into a controller.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 4 is a flow diagram of an example method for bloom filter integration into a controller in accordance with a number of embodiments of the present disclosure.

DETAILED DESCRIPTION

Figure 1:
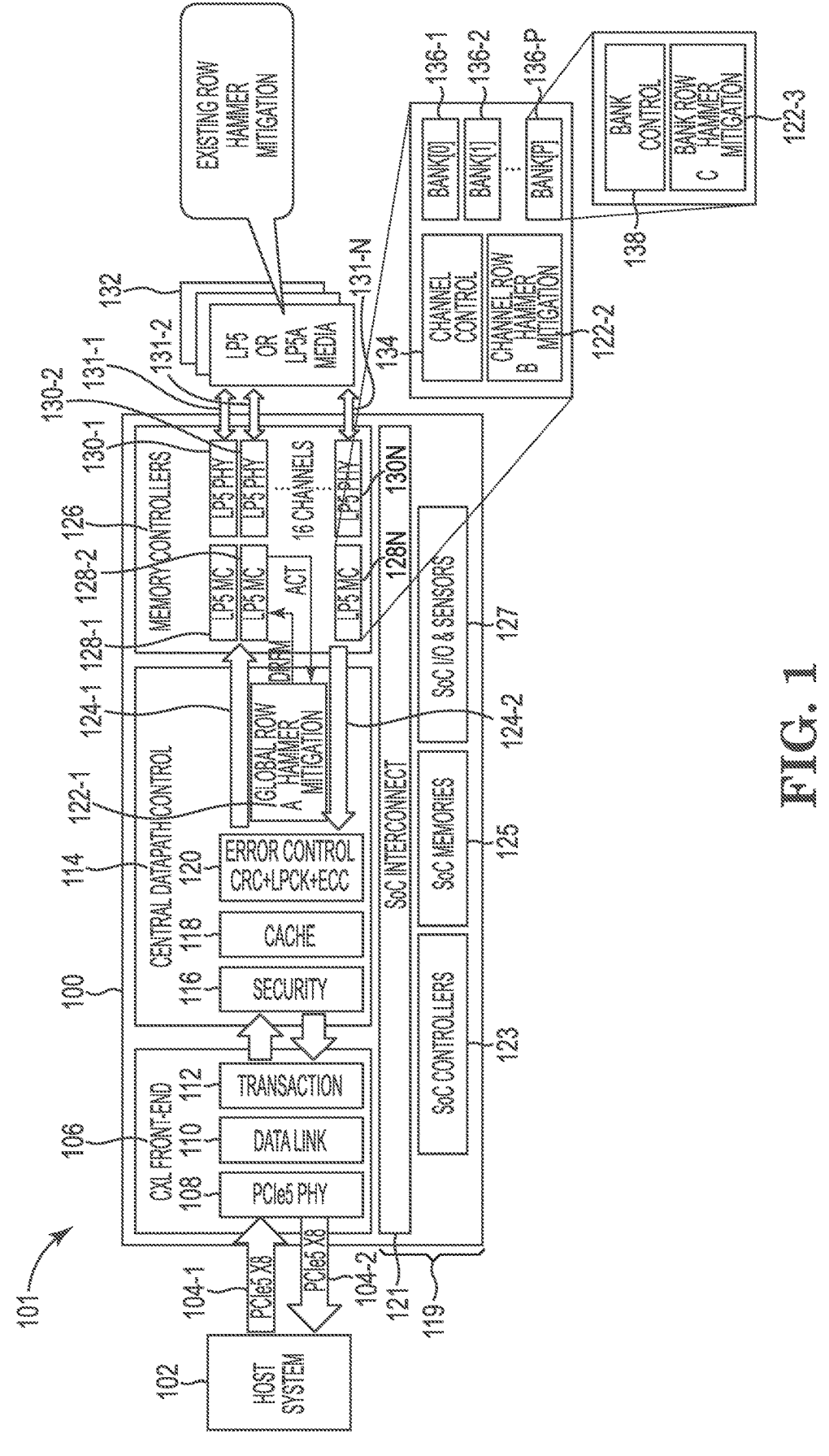
FIG. 1 illustrates a functional block diagram in the form of a computing system including bloom filter integration into a controller in accordance with a number of embodiments of the present disclosure.

Systems, apparatuses, and methods related to bloom filter integration into a controller are described. A controller includes a front end portion, a central controller portion, a back end portion, and a management unit that can manage different types of memory devices. The central controller portion is configured to cause performance of a memory operation and comprises a cache memory to store data associated performance of the memory operation, a security component configured to encrypt the data before storing the data in a memory device and decrypt the data before the data is transferred to the cache memory or a memory component that requested the data, and error control circuitry encode and decode the data. In some embodiments, the memory component that requested the data can be a memory device.

Systems, apparatuses, and methods related to bloom filter integration into a controller (e.g., a memory or media controller) are described. The counting bloom filter (e.g., bloom filter) can be used to detect row hammer events, endurance degrading events, or hot (e.g., frequently used) virtual memory page events in a media row of a memory device coupled to the controller. As used herein, the term "bloom filter" refers to a probabilistic data structure used to test whether an element is a member of a set. As used herein, the term "row hammer event" refers to a security exploit that takes advantage of an unintended and undesirable side effect in DRAM in which memory cells interact electrically between themselves by leaking their charges, possibly changing the contents of nearby memory rows that were not addressed in the original memory access. As used herein, the term "endurance degrading event" refers to the overuse of memory cells such that they degrade and no longer store data reliably within specified time or environmental conditions. Endurance degrading events can occur in a manner similar to row hammer events and can be considered a type of row hammer event.

The bloom filter can be integrated into the controller at different levels. For example, the bloom filter can be integrated at a global level, a channel level, and a memory bank level. A bloom filter integrated on the global level can be integrated in the central portion of the controller and bloom filters integrated at the channel level or memory bank level can be integrated into the back end portion of the controller.

As memory devices continue to shrink, the row hammer threshold of memory devices has decreased to a level at which normal computer system programs can inadvertently corrupt their own data or the data of another program sharing the same system's memory. This increases the probability that a row hammer event will occur during the operation of the memory device. Similarly, as memory devices continue to shrink, memory devices become more susceptible to endurance degrading events.

In some approaches, probabilistic row hammer detector algorithms can be used to detect a row hammer event. These approaches cannot guarantee an accurate prevention of data corruption in every row hammer event scenario. Therefore, if someone who wants to cause a row hammer event in the memory device knows sufficient details of these existing row hammer detection methods and their implementation mechanisms, that person can exploit the weaknesses of these row hammer detection methods to bypass or break them and corrupt the data. Alternatively, implementing a perfect row hammer detection algorithm requires too much memory and operating power to be practically useful.

In contrast, embodiments described herein are directed to integrating a counting bloom filter row hammer detection algorithm into a controller. By implementing the bloom filter into the controller, row hammer event detection can be performed using less memory and operating power than other approaches, such as implementing a perfect row hammer detection algorithm. This allows the row hammer detection to be implemented in a wider range of system options, as well as use different amounts of memory media without requiring proportional changes in row hammer detector memory or power. Further, embodiments described herein ensure that row hammer events are detected because bloom filters do not incur false negatives. As used herein, the term "false negative" refers to an error in which a test result incorrectly indicates the absence of a condition when the condition is actually present. Therefore, a bloom filter will detect possible row hammer events on a memory row.

Further benefits of implementing a bloom filter into the controller is that the efficiency of the bloom filter increases as the memory capacity of the memory device being monitored by the bloom filter increases. The size of a bloom filter is determined by the possible number of row hammer events within a time period instead of the memory capacity of the memory device being monitored by the bloom filter. This means that the memory capacity of the memory device being monitored by the bloom filter can be increased without increasing the size of the bloom filter. This means the bloom filter described in the approach herein can execute media row tracking using less resources than other approaches for detecting row hammer events in which the resources used to detect row hammer events increases as the memory capacity of the memory device being monitored increases.

In some embodiments, the memory system can be a Compute Express Link (CXL) compliant memory system (e.g., the memory system can include a peripheral component interconnect express (PCIe)/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates a functional block diagram in the form of a computing system 101 including bloom filter 122-1, 122-2, 122-3 (individually or collectively referred to as bloom filter 122) integration into a controller 100 in accordance with a number of embodiments of the present disclosure. The computing system 101 can include a memory controller 100 comprising a front end portion 106, a central controller portion 114, a back end portion 126, and a management unit 119. The computing system 101 can include a host 102 and memory device 132.

The memory controller 100 can have a front end portion 106 that includes an interface to couple the memory controller 100 to the host 102 through input/output (I/O) lanes 104-1, 104-2 (individually or collectively referred to as I/O lanes 104) and circuitry to manage the I/O lanes 104. The front end portion 106 can include a physical layer 108, a data link 110, and a transaction component 112.

The memory controller 100 can include a central controller portion 114 that can control, in response to receiving a request from the host 102, performance of a memory operation. The memory operation can be a memory operation to read data from a memory device 132 or an operation to write data to a memory device 132. In some embodiments, the central controller portion 114 can, in response to receiving a request from the host 102, control writing of multiple pages of data substantially simultaneously.

The central controller portion 114 can include a cache memory 118 to store data associated with performance of a memory operation and/or a security component 116 to encrypt data before the data is stored in the memory device 132 and/or the cache memory. Examples of the security component 116 can include, but are not limited to, software and circuitry configured to implement data encryption, data hashing, data masking, and data tokenization. In some embodiments, in response to receiving a request from the host 102, data from the host 102 can be stored in cache lines of the cache memory 118. The data in the cache memory 118 can be written to a memory device 132. In some embodiments, the data can be encrypted using an Advanced Encryption Standard (AES) encryption before the data is stored in the cache memory 118. In some embodiments, the memory controller 100 can be configured to increment the counting bloom filter 122 in response to a row activation caused by a cache miss (e.g., in response to an address associated with a read or write command not being stored in the cache).

The central controller portion 114 can include error control circuitry 120 to encode and decode the data. In some embodiments, the error control circuitry 120 can include cyclic redundancy check (CRC) circuitry, low power chipkill (LPCK) circuitry, and error correction code (ECC) circuitry.

The central controller portion 114 can also implement a counting bloom filter 122-1. The bloom filter 122-1 can be configured to count a number of activate commands sent to the memory device 132. As used herein, the term "activate command" refers to a command that opens a row in a memory device. Opening a row allows the row to be accessed such that memory operations, such as read and write operations, can be performed on the memory row. In some embodiments, counting the number of activate commands sent to the memory device 132 can refer to the memory controller 100 incrementing the counting bloom filter 122 in response to the memory device 132 receiving the activate command. The bloom filter can count the number of activate commands by monitoring a command bus.

In some embodiments, the bloom filter 122-1 can be coupled to a plurality of media controllers 128-1, 128-2, . . . , 128-N (individually or collectively referred to as media controllers 128). In some embodiments, each memory controller 128 can include channel control circuitry 134, memory banks 136-1, 136-2, . . . , and 136-P (individually or collectively referred to as memory banks 136), and a bloom filter 122-2. Further, in some embodiments, each memory bank 136 can include bank control circuitry 138 and a bloom filter 122-3. When the bloom filter 122-1 is coupled to a plurality of media controllers 128, the bloom filter 122-1 can detect possible row hammer events on the media controllers 128 within a time period. In some embodiments, the time period can be a refresh interval of a memory device. As used herein, a "refresh interval" refers to a maximum time interval between refresh operations of the memory device 132. As used herein, a "refresh operation" refers to the process of periodically reading information from an area on memory and immediately rewriting the read information to the same area without modification for the purpose of preserving the information. In some embodiments, the time period can be an amount of time that is different than the refresh interval.

In some embodiments, the memory controller 100 can comprise a back end portion 126 comprising at least one media controller 128 and physical (PHY) layer 130 that couples the memory controller 100 to a plurality of memory ranks of the memory device 132. As used herein, the term "PHY layer" generally refers to the physical layer in the Open Systems Interconnection (OSI) model of a computing system. The PHY layer may be the first (e.g., lowest) layer of the OSI model and can be used to transfer data over a physical data transmission medium. In some embodiments, the physical data transmission medium can be a plurality of channels 131-1, 131-2, . . . , 131-N. As used herein, the term "memory ranks" generally refers to a plurality of memory chips (e.g., DRAM memory chips and/or FeRAM memory chips) that can be accessed simultaneously. In some embodiments, the channel 131 may have a sixteen (16)-bit data bus. Further, the back end portion 126 can include an interface to couple the back end portion 126 to the central controller portion 114 through I/O lanes 124-1, 124-2 (individually or collectively referred to as I/O lanes 124).

The memory controller 100 can be configured to determine whether a value of the counting bloom filter 122 exceeds a threshold value. In some embodiments, the threshold value can be a row hammer threshold value. As used herein, the term "row hammer threshold value" refers to a minimum number of activate commands received by a row within a refresh interval to cause a row hammer event. The memory controller 100 can determine whether the value of a counter exceeds the threshold value by comparing the value of the counter to the threshold value. The upper limit of the threshold value can be determined by the minimum number of activate commands received within a refresh interval to cause a row hammer event. In some embodiment, the threshold value can be configured to be lower than the row hammer threshold value to avoid allowing the number of activate commands received by a memory row in a refresh interval from ever reaching the row hammer threshold value. Lowering the threshold value can trigger more responses to possible row hammer events from the memory controller 100 since, the lower the threshold value, the more often the value of the counter will exceed the threshold value. This may decrease a number of row hammer events since the memory controller 100 triggers responses to possible row hammer events more often, however, this can impact the performance of the memory device 132 because more time and resources are used in triggering more responses to possible row hammer events.

The choice of the row hammer threshold value can decrease the number of attacks, such as a waterfall attack, to a memory device. As used herein, the term "waterfall attack" refers to a row hammer attack in which a potential row hammer event is detected on a row of memory and the action taken by a memory device in response to detecting the potential row hammer event could trigger a row hammer response in a different memory row due to the different row of memory being close to the row hammer threshold. This could trigger another row hammer response in yet another memory row and continue to cause row hammer responses in subsequent rows of memory. This can lead to a denial of service, e.g., a delay in the memory device responding to a subsequent row hammer attack, because the memory device may not respond to the subsequent row hammer attack until it finishes the row hammer responses involved in the waterfall attack. This can increase the latency of an access to the memory because the execution of subsequent memory operations may be delayed until the row hammer responses in the row hammer attack complete. Increasing a row hammer threshold can minimize the instances of waterfall attacks because, increasing the row hammer threshold will increase the number of activate commands in a refresh period that would trigger a row hammer response. This will decrease the probability of the memory device experiencing a waterfall attack since more activate commands within a refresh period will be needed to trigger the row hammer response.

The memory device controller 100 can be configured to perform an action in response to determining that the value of a counter exceeds the threshold value. In some embodiments, the action can include, but is not limited to, activating or precharging a row adjacent to the row experiencing the possible row hammer event and interrupting the host's 102 operating system.

In some embodiments, the memory controller 100 can comprise a back end portion 126 comprising at least one media controller 128 and physical (PHY) layer 130 that couples the memory controller 100 to a plurality of memory ranks of the memory device 132. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 131-1, 131-2, . . . , 131-N. As used herein, the term "memory ranks" generally refers to a plurality of memory chips (e.g., DRAM memory chips and/or FeRAM memory chips) that can be accessed simultaneously. In some embodiments, the channel 131 may have a sixteen (16)-bit data bus.

In some embodiments, the bloom filter 122-2 can be implemented into the back end portion 126 of the memory controller 100. The bloom filter 122-2 implemented in the back end portion 126 of the memory controller 100 can be implemented at a channel level. As used herein, implementing a bloom filter 122-2 at a "channel level" refers to implementing the bloom filter 122-2 into a media controller (e.g., media controller 128) such that the bloom filter 122-2 monitors a channel that couples the memory controller 100 to the memory device 132.

In some embodiments, each of the plurality of media controllers 128 can include a bloom filter 122-2. In some embodiments, the size of the bloom filter 122-2 in each of the plurality of media controllers 128 can be determined by the possible number of row hammer events in a time period on the media controller 128 that includes the bloom filter 122-2. In some embodiments, the memory controller 100 can use sixteen channels to couple the memory controller 100 to the memory device 132. In this embodiment, if the bloom filter 122-2 is implemented at the channel level, sixteen bloom filters 122-2 will be implemented into the memory controller 100 such that each bloom filter 122-2 corresponds to a different channel 131. Implementing the bloom filter 122-2 at a channel level is less efficient and utilizes more memory resources than implementing the bloom filter 122-1 at a global level because more bloom filters 122-2 are implemented into the memory controller 100. However, implementing the bloom filter 122-2 at a channel level increases the accuracy of the row hammer event detection in comparison to implementing the bloom filter 122-1 at the global level because each bloom filter 122-2 only monitors a single media controller 128 instead of a single bloom filter 122-1 monitoring multiple media controllers 128 simultaneously.

In some embodiments, the bloom filter 122-3 can be implemented at a memory bank level. As used herein, implementing the bloom filter 122-3 at a memory bank level refers to implementing a bloom filter (e.g., bloom filter 122-3) into every memory bank 136-1, 136-2, . . . , 136-P (individually or collectively referred to as memory banks 136) of a media controller 128 such that the bloom filter 122-3 monitors the possible number of row hammer events at each memory bank in a time period.

The size of the bloom filter 122-3 can be determined by the possible number of row hammer events on a memory bank 136 in a time period. As shown in FIG. 1, each media controller 128 can include a bloom filter 122-3 when the bloom filter 122-3 is implemented at a memory bank level. Implementing the bloom filter 122-3 at the memory bank level decreases the efficiency of the row hammer detection and uses more memory resources than if the bloom filter 122 was implemented at the global level or channel level. However, implementing the bloom filter 122-3 at the memory bank level increases the accuracy of the row hammer detection since each memory bank 136 is being monitored by a bloom filter 122-3.

In some embodiments, the memory controller 100 can include a management unit 119 to initialize, configure, and/or monitor characteristics of the memory controller 100. The management unit 119 can include a system on a chip (SoC) interconnect 121 to couple different components to the memory controller 100, one or more SoC controllers 123 to execute instructions associated with initializing, configuring, and/or monitoring the characteristics of the memory controller 100, SoC memory 125 to store codes and/or data associated with managing and/or monitoring characteristics of the memory controller 100, and SoC I/O bus and sensors 127 to transfer out-of-band data or commands. As used herein, the term "out-of-band data and/or commands" generally refers to data and/or commands transferred through a transmission medium that is different from the main transmission medium of a network.

Figure 2A:
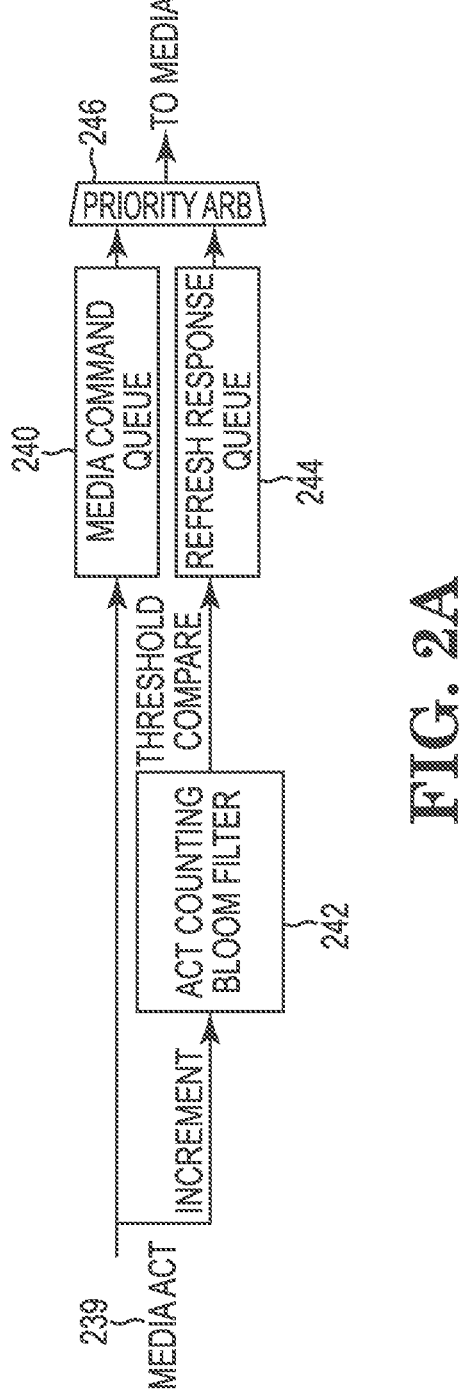
FIG. 2A illustrates a process for bloom filter integration into a controller in accordance with a number of embodiments of the present disclosure.

FIG. 2A illustrates a process for bloom filter integration into a controller in accordance with a number of embodiments of the present disclosure. As shown in FIG. 2A, media commands, such as activate commands, can be queued in a command queue 240. The activate command can open a row of a memory device. Once the row is open, a column command can be executed to perform a read operation or a write operation on the memory row. Once the column command has been executed, a precharge command can be issued to close the memory row. Without row hammer detection, this process is susceptible to a row hammer event.

According to a number of embodiments of the present disclosure a bloom filter 242 can be integrated into the memory controller (e.g., memory controller 100 in FIG. 1) to perform row hammer detection. A bloom filter 242 can increment a counter when an activate command 239 is detected in a portion of the memory device being monitored by the bloom filter 242. For example, each time the counting bloom filter 242 detects an activate command 239, the counting bloom filter 242 can increment a counter by a value of one. As further described in FIG. 2B, the count of the bloom filter 242 can also be decremented.

The memory device (e.g., memory device 132 in FIG. 1) can include a plurality of banks and/or channels and the counting bloom filter 242 can include a plurality of tables corresponding to the plurality of banks and/or channels. In some embodiments, the memory controller can maintain a quantity of counting bloom filters 242 equal to a quantity of the plurality of banks and/or channels. Each of the plurality of tables can also store the value of a corresponding counter that counts a number of activate commands detected by the bloom filter 242.

In some embodiments, such as when a count_min dealiasing method is implemented into the memory device as described in reference to FIG. 4, the counts of multiple counters can be incremented in response to the bloom filter 242 detecting an activate command 239. In embodiments in which three counters are incremented in response to the bloom filter 242 detecting the activate command 239, the address of the activate command 239 can be hashed three different ways and the hash of the address of the activate command 239 can be looked up in three different tables that each correspond to the three counters. Therefore, the value of three different counters can be read out, incremented by one, and written back. Each counter can be checked to see if the value of the counter exceeds a threshold (e.g., row hammer threshold) value. If the value of one of the counters exceeds the threshold value, the memory system (e.g., memory system 101) can respond to a potential row hammer event at the address of the activate command 239. In some embodiments, the memory controller can include a single-port memory configured to provide storage for the plurality of tables and a capacity of the single-port memory corresponds to a quantity of rows that can be activated in the corresponding bank and/or channel within the time period. In some embodiments, a priority arbiter 246 can decide whether to transfer a command from the command queue in the process represented by box 240 or transfer a refresh command from the refresh command queue 244 to a memory device (e.g., memory device 132).

Figure 2B:
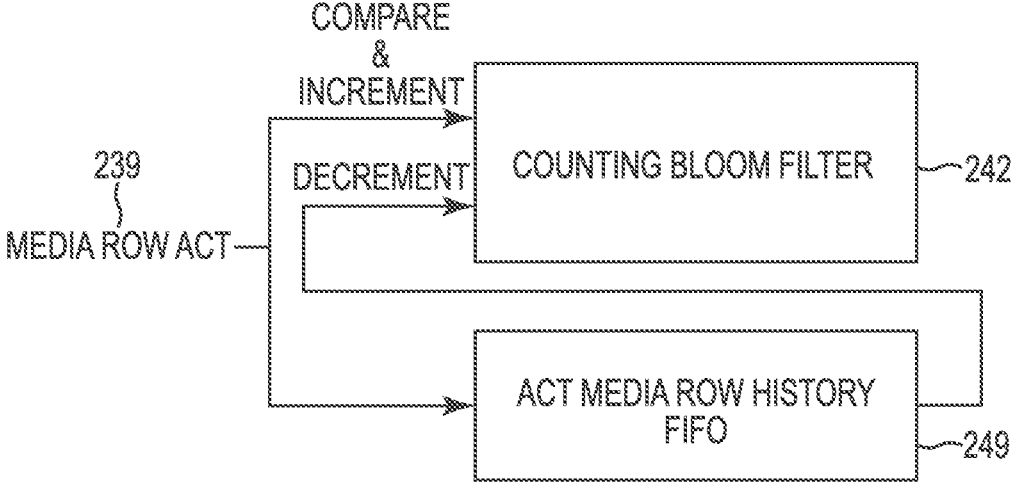
FIG. 2B illustrates a bloom filter that implements a first in first out (FIFO) queue in accordance with embodiments of the present disclosure.

FIG. 2B illustrates a bloom filter that implements a first in first out (FIFO) queue in accordance with embodiments of the present disclosure. FIG. 2B is similar to the process described in FIG. 2A. However, FIG. 2B includes a FIFO queue 249 to decrement a counter of the counting bloom filter 242.

A bloom filter 242 can increment a counter when the bloom filter 242 detects an activate command 239. The counter can also be decremented so that the counter in the FIFO queue 249 can keep an accurate count of activate commands. In some embodiments, the counters can be decremented by storing a history of activate commands. For example, after the activate command 239 is received within the memory device, the activate command can be time-stamped and placed in the FIFO queue 249. As new requests (e.g., activate commands) are received by the memory controller, the requests are stored in the FIFO queue 249 and checked by the bloom filter 242. Once a new request has been serviced, the memory controller can check the FIFO queue 249 for the oldest request in the FIFO queue 249 and determine if it is old enough to decrement its associated counter. If the oldest request in the FIFO queue 249 is old enough to decrement its associated counter, the bloom filter 242 can decrease that counter by one.

Figure 3:
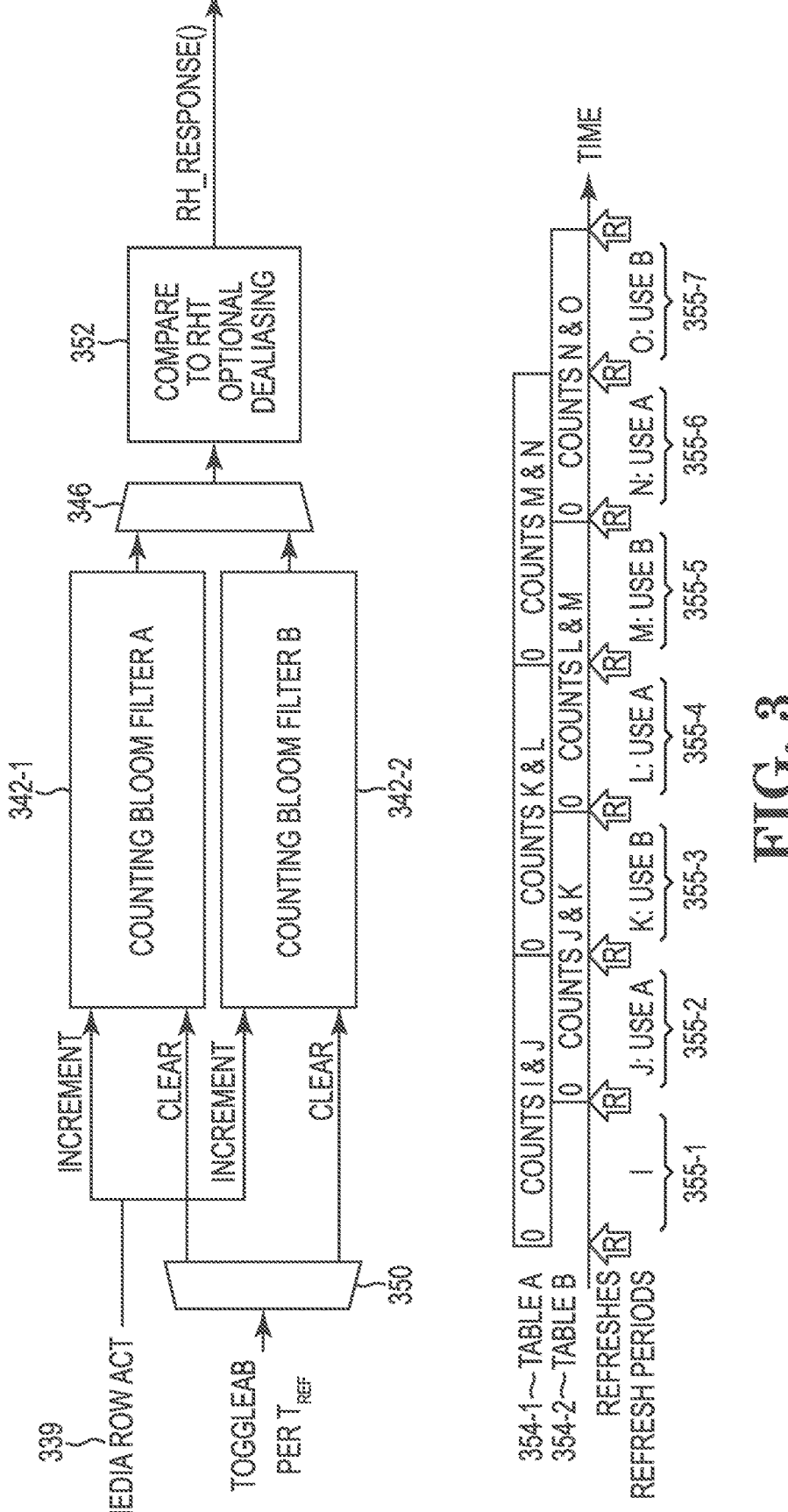
FIG. 3 illustrates a process for implementing a plurality of bloom filters into a controller in accordance with a number of embodiments of the present disclosure.

FIG. 3 illustrates a process for implementing a plurality of bloom filters into a memory controller in accordance with a number of embodiments of the present disclosure. FIG. 3 illustrates a first bloom filter 342-1 and a second bloom filter 342-2 being implemented such that they monitor the same portion of memory. In some embodiments, the first bloom filter 342-1 and the second bloom filter 342-2 can be configured to operate the same. For example, if either bloom filter 342-1 or 342-2 is configured to employ a dealiasing method, the other of either bloom filter 342-1 or bloom filter 342-2 can be configured to employ the same dealiasing method. If either of bloom filter 342-1 or bloom filter 342-2 is not configured to employ a dealiasing method, the other of bloom filter 342-1 or bloom filter 342-2 is also not configured to employ a dealiasing method. Toggle component 350 can be used to toggle between bloom filters 342 when incrementing counters and comparing the value of the counters to the threshold value. In some embodiments, the memory controller can be configured to increment the first bloom filter 342-1 and the second bloom filter 342-2 in response to a row activation caused by a cache miss In some embodiments, the memory controller (e.g., memory controller 100 in FIG. 1) can be configured to increment the first bloom filter 342-1 and the second bloom filter 342-2 in response to the memory device receiving a row activate command. The controller can determine whether a first value of the first bloom filter 342-1 (the count of the first bloom filter 342-1) or a second value of the second bloom filter 342-2 (the count of the second bloom filter 342-2) exceeds a threshold value on alternating refresh intervals out of phase with each other. For example, the controller can be configured to determine whether the count of the first bloom filter 342-1 exceeds its threshold on odd numbered refresh intervals and determine whether the count of the second bloom filter 342-2 exceeds its threshold on even numbered refresh intervals. As illustrated at 355-1, 355-2, 355-3, 355-4, 355-5, 355-6, 355-7, the refresh inter-vals can overlap (e.g., a second-in-time refresh interval can begin before a first-in-time refresh interval is complete). The controller can be configured to perform an action in response to the first value or the second value exceeding the threshold value. The action performed by the controller can include, but is not limited to, activating or precharging a row adjacent to the row experiencing the possible row hammer event, and interrupting the host's operating system. Further, the memory controller can also be configured to decrement the counters. In some embodiments, the memory device can store a count of activate commands received by a row of the memory device during a time period that is greater than or equal to a single refresh interval 355-1, 355-2, . . . , 355-7 (individually or collectively referred to as refresh interval 355) of the memory device and less than two refresh intervals 355 of the memory device.

As shown in FIG. 3, the memory controller can be configured to refresh (e.g., clear) a counter of the first bloom filter 342-1 and a counter of the second bloom filter 342-2 on alternating refresh intervals 355, out of phase with each other. In this embodiment, when the plurality of bloom filters 342 detects an activate command 339, the plurality of bloom filters 342 can increment corresponding counters. The memory controller determines whether the value of a counter exceeds the threshold value during alternating refresh intervals 355 relative to the other of the plurality of bloom filters 342.

As shown in tables 354-1 and 354-2, bloom filter 342-1 can increment a count (e.g., number of activate commands) I and compare a value of the count I to a threshold value at a first refresh interval 355-1. Further, both bloom filter 342-1 and bloom filter 342-2 can increment a count J and bloom filter 342-2 can compare a value of count J to a threshold value during a second refresh interval 355-2. Table A 354-1 corresponds to bloom filter 342-1 and table B 354-2 corre-sponds to bloom filter 342-2. Bloom filter 342-1 can clear the count J in Table A 354-1 at the end of the second refresh interval 355-2. Bloom filter 342-1 and bloom filter 342-2 can increment the count K during the third refresh interval 355-3. Further, bloom filter 342-2 can compare the value of the count K to the threshold value during the third refresh interval 355-3 and reset the count K in Table B 354-2 at the end of the third refresh interval 355-3. Bloom filters 342-1 and 342-2 can increment a count L during a fourth refresh interval 355-4. Further, bloom filter 342-1 can compare the value of the count L to the threshold value during the fourth refresh interval 355-4 and reset the count L in Table A 354-1 at the end of the fourth refresh interval 355-4. Bloom filters 342 can increment a count M during the fifth refresh interval 355-5 and bloom filter 342-2 can compare the value of the count M to the threshold value. Bloom filter 342-2 can clear the count M in Table B 354-2 at the end of the fifth refresh interval 355-5. Bloom filters 342 can increment a count N during the sixth refresh interval 355-6. Bloom filter 342-1 can compare the value of the count N to a threshold value and clear the count N in Table A 354-1 at the end of the sixth refresh interval 355-6. Bloom filter 342-2 can increment a count O during the seventh refresh interval 355-7. Bloom filter 342-2 can compare the value of the count O to the threshold value during the seventh refresh interval 355-7 and clear the count O in Table B 354-2 at the end of the seventh refresh interval 355-7. In some embodiments, the memory controller is configured to skip the determination of whether the first value of the first counting bloom filter 342-1 or the second value of the second bloom filter 342-2 exceeds the threshold for an initial refresh interval 355-1.

FIG. 4 illustrates a flow diagram of an example method 456 for bloom filter integration into a controller in accor-dance with a number of embodiments of the present disclo-sure. The method 456 can be performed by processing logic that can include hardware (e.g., processing device, circuitry, dedicated logic, programmable logic, microcode, hardware of a device, integrated circuit, etc.), software (e.g., instruc-tions run or executed on a processing device), or a combi-nation thereof. Although shown in a particular sequence or order, unless otherwise specified, the order of the processes can be modified. Thus, the illustrated embodiments should be understood only as examples, and the illustrated pro-cesses can be performed in a different order, and some processes can be performed in parallel. Additionally, one or more processes can be omitted in various embodiments. Thus, not all processes are required in every embodiment. Other process flows are possible.

At block 458, the method 456 can include, in response to a row activate command of a memory device coupled to the memory controller, incrementing a corresponding value of a counting bloom filter implemented by a memory controller. The method 456 can further comprise hashing an address associated with the row activate command to produce a resulting value. Further, incrementing the corresponding value comprises incrementing a value of the bloom filter corresponding to the resulting value. Further, the method 456 can comprise decrementing the corresponding value of the counting bloom filter after at least one other row activate command of the memory device.

At block 460, the method 456 can include determining whether the corresponding value of the counting bloom filter exceeds a threshold value. In some embodiments, the memory controller can detect and correct errors in the data output by the bloom filter in parallel to the bloom filter incrementing the counters. In some embodiments, the errors in the data can be detected using error control circuitry such as CRC circuitry, LPCK circuitry, and ECC circuitry.

At block 462, the method 456 can include executing, by the memory controller, an action in response to the corresponding value exceeding the threshold value. In some embodiments, the bloom filter can experience aliasing. As used herein, the term "aliasing" refers to a bloom filter erroneously determining that a value of a counter is greater than the threshold value and triggering a bloom filter response due to activate commands being sent to multiple rows mapped to the same counter in a single refresh interval. For example, multiple rows of memory that are mapped to a counter may receive activate commands but none of the rows individually have received enough activate commands within the refresh interval for the value of the counter to exceed the threshold value. However, if the number of activate commands received by all of the rows mapped to that counter combined exceed the threshold value, the bloom filter can erroneously trigger a row hammer mitigation response to every row that has received an activate command within the refresh interval. This can adversely impact system performance and power consumption. Dealiasing methods can be implemented into the bloom filter to avoid erroneously triggering row hammer responses due to aliasing.

In some embodiments, the term "dealiasing" refers to separating the counts of the activate commands for each row associated with a counter such that the count of each row can be monitored individually. The dealiasing methods can include, but are not limited to, a count_min algorithm, adding a row identification (ID) tag and unique flag to the counter, and adding an additional dealiasing table when an additional bloom filter is added to the memory controller.

The count_min algorithm is a probabilistic data structure that serves as a frequency table of events in a stream of data. In some embodiments, the count_min algorithm can be implemented into the bloom filter such that the bloom filter only increments a counter and triggers a row hammer response based on the lowest-valued of the counters addressed by the hash function of the incoming media row ID. By only incrementing a counter and triggering a row hammer response based on the lowest-valued of the counters addressed by the hash functions, the count_min algorithm can cause a bloom filter to trigger a row hammer response only when the activate commands received by a single row corresponding to the counter are greater than the threshold value.

Another dealiasing method is adding a media row ID tag and unique flag for each counter. In some embodiments, a counter is incremented only if a counter's unique flag is set and an ID tag of the counter matches the incoming media row ID. If none of the counters have both a unique flag set and an ID tag that matches the incoming media row ID tag, the memory controller can clear the unique flag, increment the lowest valued counter addressed by the hash function of the incoming media row ID, and trigger a row hammer response to that media row ID if the value of that counter exceeds the threshold value.

Another dealiasing method is adding an additional dealiasing table when an additional bloom filter is added to the memory controller. The dealiasing table indexing could be any of direct mapped, set associative, skew associative, or fully associative. In some embodiments, each table entry can contain a count of activate commands received by a memory row and a tag that can be matched to the media row ID. If the minimum bloom filter counter addressed by the hash function of the incoming media row ID exceeds a dealiasing table allocation threshold, the existing dealising table entry with the minimum counter value can be replaced. In some embodiments, if an incoming media row ID matches a dealising table ID tag, only the dealising table entry counter may be incremented.

The figures herein follow a numbering convention in which the first digit or digits correspond to the figure number and the remaining digits identify an element or component in the figure. Similar elements or components between different figures may be identified by the use of similar digits. For example, 239 may reference element "39" in FIG. 2, and a similar element may be referenced as 339 in FIG. 3. A group or plurality of similar elements or components may generally be referred to herein with a single element number. For example, a plurality of reference elements 130-1 to 130-N may be referred to generally as 130. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device having a refresh interval comprising a maximum time interval between refresh operations of the memory device; and
   a memory controller coupled to the memory device, the memory controller configured to:
      detect whether an activate command is in a portion of the memory device that is being monitored by a counting bloom filter, wherein the counting bloom filter is integrated into the memory controller;
      increment the counting bloom filter in response to the activate command being detected in the portion of the memory device that is being monitored by the counting bloom filter;
      determine whether a value of the counting bloom filter exceeds a threshold value for row hammer detection, wherein the memory controller is configured to skip the determination of whether the value of the counting bloom filter exceeds the threshold value for row hammer detection for an initial refresh interval and determine whether the value of the counting bloom filter exceeds the threshold value for row hammer detection during a second refresh interval; and
      perform row hammer mitigation in response to the value exceeding the threshold value for row hammer detection.

2. The apparatus of claim 1, wherein the memory device includes a plurality of banks or channels; and
   wherein the counting bloom filter includes a plurality of tables corresponding to the plurality of banks or channels.

3. The apparatus of claim 2, wherein the memory controller is configured to increment the counting bloom filter in response to each row activate command received by the memory device within a time period;
   wherein the memory controller includes a single-port memory configured to provide storage for the plurality of tables; and
   wherein a capacity of the single-port memory corresponds to a quantity of rows that can be activated within the time period.

4. The apparatus of claim 3, wherein the time period is a refresh interval of the memory device.

5. The apparatus of claim 1, wherein the memory device includes a plurality of banks or channels; and
   wherein the memory controller is configured to increment a respective counting bloom filter in response to a row activate command received by the memory device for a corresponding bank or channel within a time period.

6. The apparatus of claim 5, wherein the memory controller includes a respective single-port memory configured to provide storage for the respective counting bloom filter; and
   wherein a capacity of the single-port memory corresponds to a quantity of rows that can be activated in the corresponding bank or channel within the time period.

7. The apparatus of claim 5, wherein the memory controller is configured to maintain a quantity of counting bloom filters equal to a quantity of the plurality of banks or channels.

8. The apparatus of claim 1, wherein the memory controller is configured to increment the counting bloom filter in response to a cache miss.

9. An apparatus, comprising:
   a memory device having a refresh interval comprising a maximum time interval between refresh operations of the memory device; and
   a memory controller coupled to the memory device, the memory controller including a first counting bloom filter and a second counting bloom filter, wherein the memory controller is configured to:
      detect whether an activate command is in a portion of the memory device that is being monitored by the first counting bloom filter and the second counting bloom filter, wherein the first counting bloom filter and the second counting bloom filter are integrated into the memory controller;
      increment the first counting bloom filter and the second counting bloom filter in response to a portion of the memory device that is being monitored by the first counting bloom filter and the second counting bloom filter receiving a row activate command;
      determine whether a first value of the first counting bloom filter or a second value of the second counting bloom filter exceeds a threshold value for row hammer detection on alternating refresh intervals, out of phase with each other, wherein the memory controller is configured to skip the determination of whether the first value of the first counting bloom filter or the second value of the second counting bloom filter exceeds the threshold value for row hammer detection for an initial refresh interval and determine whether the first value of the first counting bloom filter or the second value of the second counting bloom filter exceeds the threshold value for row hammer detection during a second refresh interval; and
      perform row hammer mitigation in response to the first value or the second value exceeding the threshold value for row hammer detection.

10. The apparatus of claim 9, wherein the first counting bloom filter and the second counting bloom filter have a same structure; and
    wherein the memory controller is configured to refresh the first counting bloom filter and the second counting bloom filter on alternating refresh intervals, out of phase with each other.

11. The apparatus of claim 9, wherein the memory controller is configured to increment the first counting bloom filter and the second counting bloom filter in response to a cache miss.

12. A method, comprising:
    detecting whether a row activate command is in a portion of a memory device that is being monitored by a counting bloom filter, wherein the counting bloom filter is integrated into a memory controller and the memory device has a refresh interval comprising a maximum time interval between refresh operations of the memory device;
    in response to the row activate command being detected in the portion of the memory device that is being monitored by the counting bloom filter, incrementing a corresponding value of the counting bloom;

determining whether the corresponding value of the counting bloom filter exceeds a threshold value of row hammer detection, wherein the memory controller is configured to skip the determination of whether the value of the counting bloom filter exceeds the threshold value of row hammer detection for an initial refresh interval and determine whether the corresponding value of the counting bloom filter exceeds the threshold value for row hammer detection during a second refresh interval; and executing, by the memory controller, row hammer mitigation in response to the corresponding value exceeding the threshold value of row hammer detection.

13. The method of claim 12, further comprising, in response to the row activate command of the memory device being detected:

hashing an address associated with the row activate command to produce a resulting value; and wherein incrementing the corresponding value comprises incrementing a value of the counting bloom filter corresponding to the resulting value.

14. The method of claim 12, further comprising decrementing the corresponding value of the counting bloom filter after at least one other row activate command of the memory device is detected.

15. The method of claim 12, further comprising dealiasing the counting bloom filter.

16. The method of claim 15, wherein incrementing the corresponding value of the counting bloom filter comprises incrementing a plurality of corresponding values of the counting bloom filter; and wherein dealiasing comprises determining whether a minimum value of the plurality of corresponding values of the counting bloom filter exceeds the threshold value for row hammer detection.

17. The method of claim 15, wherein dealiasing includes adding a row identification (ID) tag and a unique flag to a counter.

18. The method of claim 15, wherein dealiasing includes adding a dealiasing table when an additional counting bloom filter is added to the memory controller.

19. The method of claim 12, further comprising detecting and correcting, by the memory controller, errors in data output by the counting bloom filter in parallel to the counting bloom filter incrementing counters.

* * * * *